United States Patent Office 2,733,271
Patented Jan. 31, 1956

2,733,271

PREPARATION OF CHLORPHENOXY COMPOUNDS

Harry James Barber and Maurice Berkeley Green, Dagenham, England, assignors to May & Baker Limited, Dagenham, England No Drawing. Application December 15, 1952, Serial No. 326,136

Claims priority, application Great Britain December 6, 1950

10 Claims. (Cl. 260—612)

This invention relates to chlorinated ethers and particularly to the production of chlorinated ethers which are useful as insecticides, acaricides and fungicides and as intermediates in the preparation of other organic compounds.

This application is a continuation-in-part of U. S. application Serial No. 259,716, filed December 3, 1951.

The chlorinated ethers of the present invention conform to the general formula $R.O.CH_{3-n}Cl_n$ where R denotes a benzene nucleus carrying one or more chlorine atoms as the only substituents, and $n=1$, 2 or 3. It is an object of this invention to provide new processes for the production of said chlorinated ethers which are simple to carry out, economical and result in improved yields of products of a high degree of purity.

Various unsuccessful attempts have been made in the past to prepare monochloro compounds of the type $R.O.CH_2Cl$. The state of the prior art is described in United States application Serial No. 113,030, now Patent 2,668,860, which claims a new general method of preparing both unsubstituted and substituted phenoxymethyl chlorides wherein the sulphonic acids $R.O.CH_2SO_3H$ or their salts are reacted with phosphorus oxychloride, phosphorus pentachloride or thionyl chloride. This method is not applicable for the preparation of chlorides containing two or three chlorine atoms attached to the carbon atom linked to oxygen (i. e. where $n=2$ or 3) since the corresponding di- and tri-sulphonic acids have proved inaccessible.

The direct replacement by chlorine of the hydrogen atoms of the methyl group in methyl phenyl ethers appears to have been investigated only by Hugounenq (Ann. Chim. (6) 20, 1890, 551) and Weygand (J. Prakt. Chem. 155, 1940, 342–346), in the single case of anisole in an attempt to prepare anisyl chloride. Complex mixtures of chlorination products were obtained in which nuclear chlorination products were found to be present as by-products but which were not separated or individually identified.

In contrast, it has now been unexpectedly found, and this forms the basis of the present invention, that compounds of the general formula $ROCH_{3-n}Cl_n$ where R is a benzene nucleus containing one or more chlorine atoms as the only substituents, can conveniently be prepared in excellent yield and in a high state of purity, by subjecting compounds of the general formula $ROCH_{3-m}Cl_m$, where R is a benzene nucleus containing one or more chlorine atoms and $m$ is 0, 1 or 2, in the liquid phase to the action of chlorine at a temperature of 160° C. to 260° C. optionally in the presence of a catalyst as hereinafter described. Restated, the present invention provides a process for the chlorination of a chlorphenoxy methane which comprises subjecting a chlorphenoxy methane in which at most two of the hydrogen atoms of the methane residue are substituted by chlorine atoms, in the liquid phase to the action of chlorine at a temperature of 160° C. to 260° C. until the desired quantity of chlorine has been absorbed. For reasons which are hereinafter explained it is preferred to employ temperatures between 180 and 220° C. Where the starting material already contains 2 or more chlorine substituents or where, if it contains only one chlorine substituent, a catalyst favouring chlorination in the side chain is simultaneously present temperatures between 160 to 180° C. may also be employed. Thus compounds of the formula $ROCH_3$ (i. e. where $m$ is zero) may be converted successively to compounds of the formula $ROCH_2Cl(m=1)$, $R.O.CHCl_2(m=2)$ or $$R.OCCl_3(m=3)$$

by introducing one, two or three atoms of chlorine per molecule. The product may be isolated at any one of the three stages of chlorination and a lower chlorinated compound can be used as starting material for a higher chlorinated product.

Thus, in the process of this invention the chloromethyl compounds may be obtained in a substantially pure condition and in excellent yield as illustrated by the data given in Table I.

TABLE I

*Chlorination of ethers in the presence of 1/20 mole $PCl_5$ as catalyst*

| Chlorinated ether (ROCH₃) employed | Reaction temperature (° C.) | Atoms of Cl introduced (=n) | Nuclear chlorination (percent) | Yield of ROCH₃₋ₙClₙ (percent) | Other Products |
|---|---|---|---|---|---|
| 2-chloroanisole | 195–200 | 1 | 9 | 86 | |
| 4-chloroanisole | 195–200 | 1 | 2 | 94 | |
|  | 190–195 | 2 | Nil | 91 | |
|  | 190–195 | 3 | Nil | 91 | 4% dichlorobenzene. |
| 2:4-dichloroanisole | 195–200 | 1 | Nil | 97 | |
|  | 198–205 | 2 | Nil | 90 | |
|  | 195–250 | 3 | Nil | 81 | 10% trichlorobenzene. |
| 2:5-dichloroanisole | 195–200 | 1 | Nil | 98 | |
| 2:4:6-trichloranisole | 195–200 | 1 | Nil | 93 | |
|  | 195–200 | 2 | Nil | 91 | |
|  | 195–240 | 3 | Nil | 65 | 30% tetra-chlorobenzene. |
| Pentachloroanisole | 195–200 | 1 | Nil | 90 | |
|  |  | 3 | Nil | 25 | 65% hexachlorobenzene. |

To obtain a desired chlorination product in a substantially pure state and in good yield it is necessary to chlorinate under conditions which are such that the rate of chlorination in the methyl group is so much greater than the rate of chlorination in the benzene nucleus that the latter reaction does not occur to any significant extent. This favourable ratio of side chain to nuclear chlorination may be achieved by operating at high temperatures or by particular catalysts or by a combination of both these factors, the extent to which the temperature may be increased being limited by the fact that splitting of the ether linkage becomes a significant factor at temperatures in excess of about 220° C. (see Table II below). An operating temperature within the range of 180–200° C. is generally to be preferred.

The effect of the presence initially of additional chlorine atoms in the nucleus of the ether being chlorinated is to diminish the tendency for further nuclear chlorination to occur. Consequently it becomes easier to favour the side chain chlorination and thus the range of conditions under which the chlorination can be carried out is wider as will be seen from Table II.

TABLE II

*Chlorination of 4-chloroanisole with one molecule of chlorine without a catalyst*

| Reaction Temperature | Percent Yield of Products | | | |
|---|---|---|---|---|
| | 4-chloro-anisole unchanged | 2:4 dichloro anisole | 4-chloro-phenoxy-methyl chloride | 2:4-dichloro phenoxy-methyl chloride |
| 160–165° | | | 86 | 8 | |
| 168–172° | 2 | | 76 | 15 | |
| 175–180° | 4 | | 61 | 23 | 4 |
| 185–190° | 6 | | 40 | 40 | 6 |
| 195–200° | 10 | | 11 | 62 | 9 |

An alternative or additional means of increasing the yield of the desired side-chain chlorinated products is to carry out the reaction in the presence of a suitable catalyst. It has unexpectedly been found, however, and this constitutes a further feature of the invention, that among the catalysts known per se as promoters of chlorination reactions phosphorus pentachloride, phosphorus trichloride and sulphur monochloride (in for example one-twentieth molar proportion) have a remarkably specific effect in promoting chlorination in the side-chain rather than in the nucleus, while other common catalysts of the above type, e. g. iodine and metal halides, are ineffective or even decrease very considerably the yields of the desired products. These effects are illustrated by Table III below.

It is to be understood that the catalysts are described in terms of the substance added at the start. Under the chlorination conditions they may be present in the reaction mixture as higher chlorinated substances. Thus for example $PCl_3$ will be converted partially to $PCl_5$ and vice versa and whichever was added there will be present an equilibrium mixture of $PCl_3$ and $PCl_5$.

chlorine atoms into the unsubstituted or lower chlorinated benzene nucleus of the appropriate phenyl ether in a known manner under conditions favouring nuclear chlorination as a stage preceding and continuous with the process of the present invention. The present invention is to be understood to include this type of two-stage process. It is also to be understod that where such a two-stage process is operated the initial nuclear chlorination shall be carried out under such conditions as will lead to substantially pure intermediates before the side-chain chlorination is carried out. In general it is highly preferred to chlorinate in the side-chain a pure nuclear chlorinated anisole in order to obtain the final chlorinated ether in a state of purity.

The process is illustrated by the following examples:

EXAMPLE I

A mixture of 71.2 g. 4-chloroanisole and 5.25 g. phosphorus pentachloride is heated at 190–195° C. and chlorine passed in until the weight increases by 17.3 g. Carbon dioxide is passed through to remove hydrogen chloride and the mixture cooled, poured into ice and water and extracted with ether. The extract is washed twice with ice-cold N caustic soda, twice with ice-water and dried over anhydrous magnesium sulphate. The ether is evaporated off and the residue distilled, giving 79.6 g. 4-chlorophenoxymethyl chloride, B. P. 105–115° C. 15 mm. M. P. 20–26° C. By crystallisation from ice-cold light petroleum this chloride is obtained as white prisms, M. P. 29–30° C.

EXAMPLE II

A mixture of 71.2 g. 4-chloroanisole and 3.45 g. phosphorus trichloride is chlorinated as in Example I, until the weight increases by 19.1 g. The product is worked up as in Example I, giving 80.2 g. 4-chlorophenoxymethyl chloride, B. P. 105–115°/15 mm., M. P. 20–25°.

EXAMPLE III

A mixture of 71.2 g. 4-chloroanisole and 5.25 g. phosphorus pentachloride is chlorinated as in Example I until the weight increases by 34.5 g. The product is worked up as in Example I, giving 95.0 g. 4-chlorophenoxymethylene dichloride, B. P. 120–130°/15 mm.; on redistillation the product has B. P. 116.5–120.5°/13 mm., $d_{15}^{15} 1.4168, n_D^{15} 1.5550$

EXAMPLE IV

A mixture of 71.2 g. 4-chloroanisole and 5.25 g. phos-

TABLE III

| Compound Chlorinated | Catalyst | Reaction Temperature, ° C. | Nuclear Chlorinated Products (Percent) | Yield of side-chain chlorinated products (percent) |
|---|---|---|---|---|
| 4-chloroanisole | None | 160–165 | 86 | 9 |
| | | 190–195 | 26 | 64 |
| | $PCl_5$ | 160–165 | 33 | 48 |
| | $PCl_5$ | 175–180 | 10 | 80 |
| | $PCl_5$ or $PCl_3$ | 190–195 | Nil | 92 |
| | $S_2Cl_2$ | 190–195 | 9 | 80 |
| | Other catalysts [1] | 190–195 | 90–95 | Nil |
| 2:4-dichloranisole | None | 190–195 | 9 | 86 |
| | $PCl_5$ (or $PCl_3$) | 190–195 | Nil | 97 |
| | $S_2Cl_2$ | 190–195 | Nil | 95 |
| | $I_2$ | 190–195 | 7 | 80 |
| | $SnCl_4$ | 190–195 | 90 | 5 |
| | $SbCl_3$ | 190–195 | 85 | 5 |
| 2:4:6-trichloroanisole | None | 190–195 | 6 | 88 |
| | $PCl_5$ (or $PCl_3$) | 190–195 | Nil | 94 |
| | $SnCl_4$ | 190–195 | 5 | 90 |

[1] These include $ZnCl_2$, $HgCl_2$, $AlCl_3$, $TiCl_4$, $SnCl_4$, $AsCl_3$, $SnCl_3$, $BiCl_3$, $I_2$ and $FeCl_3$.

It will be noted that high yields of side-chain chlorinated products may be obtained without the use of a catalyst as, for example, in the case of 2:4-dichloroanisole and 2:4:6-trichloroanisole.

The initial materials employed in the present invention may be produced by the introduction of one or more phorus pentachloride is chlorinated as in Example I until the weight increases by 52.0 g. The product is worked up as in Example I. On distillation there is obtained, after a small fore-run of p-dichlorobenzene, 110 g. 4-chlorophenoxymethylmethotrichloride, B. P. 130–40°/15 mm. On redistillation the product has B. P. 126.5–127.0°/13 mm.

$d_{15}^{15} 1.4967, n_D^{15} 1.5570$

EXAMPLE V 54.0 g. anisole are chlorinated at a temperature not exceeding 150° until the weight increases by 17.3 g. 5.25 g. phosphorus pentachloride are added and chlorination continued at 190–195° until the weight increases by a further 17.3 g. The product is worked up as in Example I, giving 74.8 g. 4-chlorophenoxymethyl chloride B. P. 105–115°/15 mm., M. P. 18–25°.

EXAMPLE VI 88.5 g. 2:4-dichloroanisole are chlorinated at 195–200° until the weight increases by 17.3 g. The product is worked up as in Example I giving 81.2 g. 2:4-dichlorophenoxymethyl chloride, B. P. 135–140°/20 mm., M. P. 49–52°. On recrystallisation from light petroleum the product has M. P. 55.5–56.5° C.

EXAMPLE VII

A mixture of 88.5 g. 2:4-dichloroanisole and 5.25 g. phosphorus pentachloride is chlorinated at 195–200° until the weight increases by 17.3 g. The product is worked up as in Example I, giving 103 g. 2:4-dichlorophenoxymethyl chloride, B. P. 135–140°/20 mm., M. P. 52–56°.

EXAMPLE VIII

A mixture of 88.5 g. 2:4-dichloroanisole and 3.5 g. sulphur monochloride is chlorinated as in Example VI until the weight increases by 17.3 g. The product is worked up as in Example I, giving 100 g. 2:4-dichlorophenoxymethyl chloride, B. P. 135–140°/20 mm., M. P. 51–55°.

EXAMPLE IX

A mixture of 88.5 g. 2:4-dichloroanisole and 5.25 g. phosphorus pentachloride is chlorinated at 198–205° until the weight increases by 34.5 g. The product is worked up as in Example I, giving 110 g. 2:4-dichlorophenoxymethylene dichloride, B. P. 83–86°/0.3 mm. On crystallisation from ice-cold light petroleum the product has M. P. 37–38°.

EXAMPLE X

A mixture of 88.5 g. 2:4-dichloroanisole and 5.25 g. phosphorus pentachloride is chlorinated at 195–205° until the weight increases by 34.5 g. The temperature is raised gradually to 240° and chlorination continued until the weight has increased by a further 17.3 g. The product is worked up as in Example I. On distillation there are obtained a fore-run of 1:2:4-trichlorobenzene and then 113 g. 2:4-dichlorophenoxymethotrichloride, B. P. 90–95°/0.3 mm.

EXAMPLE XI 54.0 g. anisole are chlorinated at a temperature not exceeding 150° until the weight increases by 34.5 g. 5.25 g. phosphorus pentachloride are added and chlorination continued at 190–195° until the weight increases by a further 17.3 g. The product is worked up as in Example I, giving 95.3 g. 2:4-dichlorophenoxymethyl chloride, B. P. 135–140°/20 mm., M. P. 50–55°.

EXAMPLE XII

A mixture of 88.5 g. 2:5-dichloroanisole and 5.25 g. phosphorus pentachloride is chlorinated at 190–195° until the weight increases by 17.3 g. The product is worked up as in Example I giving 104 g. 2:5-di-chlorophenoxymethyl chloride, B. P. 125–130°/18 mm., M. P. 50–53°. On recrystallisation from light petroleum the product has M. P. 52–54°.

EXAMPLE XIII 106.5 g. 2:4:6-trichloroanisole are chlorinated at 190–195° until the weight increases by 17.3 g. The product is worked up as in Example I, giving 107 g. 2:4:6-trichlorophenoxymethyl chloride, B. P. 90–95°/0.3 mm., M. P. 20–28°. On recrystallisation from light petroleum the product has M. P. 34–35°.

EXAMPLE XIV

A mixture of 106.5 g. 2:4:6-trichloroanisole and 5.25 g. phosphorus pentachloride is chlorinated at 195–200° until the weight increases by 17.3 g. The product is worked up as in Example I giving 114 g. 2:4:6-trichlorophenoxymethyl chloride, B. P. 90–95°/0.3 mm., M. P. 31–34°.

EXAMPLE XV

A mixture of 140 g. pentachloroanisole and 5.25 g. phosphorus pentachloride is chlorinated at 195–200° until the weight increases by 17.3 g. The product is worked up as in Example I. On distillation there are obtained firstly a small fore-run of hexachlorobenzene and then 140 g. pentachlorophenoxymethyl chloride, B. P. 150–160°/0.3 mm., M. P. 90–94°. On recrystallisation from light petroleum the product has M. P. 93–94°.

EXAMPLE XVI

A mixture of 106.5 g. 2:4:6-trichloroanisole and 5.25 g. phosphorus pentachloride is chlorinated at 195–205° until the weight increases by 34.5 g. The temperature is then gradually raised to 240° and chlorination continued until the weight increases no longer. The product is worked up as in Example I. On distillation there is obtained a fore-run of 32 g. 1:2:4:6-tetrachlorobenzene and then 101 g. 2:4:6-trichlorophenoxymethotrichloride, B. P. 100–103°/0.3 mm.

EXAMPLE XVII

A mixture of 140 g. pentachloroanisole and 5.25 phosphorus pentachloride is chlorinated at 195–210° until the weight increases by 34.5 g. The temperature is increased gradually to 240° and chlorination continued at that temperature. The weight decreases owing to formation of hexachlorobenzene. The product is worked up as in Example I. On distillation there are obtained a fore-run of 93 g. of hexachlorobenzene and then 48 g. pentachlorophenoxymethotrichloride, B. P. 160–170°/0.3 mm., M. P. 68–73°. On recrystallisation from light petroleum the product has M. P. 72–74°.

EXAMPLE XVIII

A mixture of 80.5 g. 4-chlorophenoxymethyl chloride and 5.25 g. phosphorus pentachloride is chlorinated at 190–195° until the weight increases by 17.3 g. The product is worked up as in Example I giving 101 g. 4-chlorophenoxymethylene dichloride, B. P. 120–130°/15 mm.

EXAMPLE XIX

A mixture of 88.5 g. 4-chlorophenoxymethyl chloride and 5.25 g. phosphorus pentachloride is chlorinated at 190–195° until the weight increases by 34.5 g. The product is worked up as in Example I, giving 119 g. 4-chlorophenoxymethotrichloride, B. P. 130–140°/15 mm.

EXAMPLE XX

A mixture of 105.8 g. 4-chlorophenoxymethylene dichloride and 5.25 g. phosphorus pentachloride is chlorinated at 190–193° until the weight increases by 17.3 g. The product is worked up as in Example I giving 118 g. 4-chlorophenoxymethotrichloride, B. P. 130–140°/15 mm.

We claim:
1. Process for the chlorination of the methane residue of a chlorophenoxymethane which comprises subjecting a chlorophenoxymethane in which at most two of the hydrogen atoms of the methane residue are substituted by chlorine atoms, in the liquid phase to the action of chlorine at a temperature of 160–260° C. until the desired quantity of chlorine has been absorbed the reaction where there is but one nuclear chlorine atom in the starting material being necessarily effected in the presence of a catalyst selected from the group consisting of phos- phorus pentachloride, phosphorus trichloride and sulphur monochloride.

2. Process for the chlorination of the methane residue of a chlorophenoxymethane which comprises subjecting a chlorophenoxymethane in which at most two of the hydrogen atoms of the methane residue are substituted by chlorine atoms, in the liquid phase to the action of chlorine at a temperature of 160–260° C. until the desired quantity of chlorine has been absorbed, the said reaction being effected in the presence of phosphorus pentachloride.

3. Process for the chlorination of the methane residue of a chlorophenoxymethane which comprises subjecting a chlorophenoxymethane in which at most two of the hydrogen atoms of the methane residue are substituted by chlorine atoms, in the liquid phase to the action of chlorine at a temperature of 160–260° C. until the desired quantity of chlorine has been absorbed, the said reaction being effected in the presence of phosphorus trichloride.

4. Process for the chlorination of the methane residue of a chlorophenoxymethane which comprises subjecting a chlorophenoxymethane in which at most two of the hydrogen atoms of the methane residue are substituted by chlorine atoms, in the liquid phase to the action of chlorine at a temperature of 160–260° C. until the desired quantity of chlorine has been absorbed, the said reaction being effected in the presence of sulphur monochloride.

5. Process for the chlorination of the methane residue of a chlorophenoxymethane which comprises subjecting a chlorophenoxymethane in which at most two of the hydrogen atoms of the methane residue are substituted by chlorine atoms, in the liquid phase to the action of chlorine at a temperature of 180–200° C. until the desired quantity of chlorine has been absorbed, the said reaction being effected in the presence of phosphorus pentachloride.

6. Process for the chlorination of the methane residue of a chlorophenoxymethane which comprises subjecting a chlorophenoxymethane in which at most two of the hydrogen atoms of the methane residue are substituted by chlorine atoms, in the liquid phase to the action of chlorine at a temperature of 180–200° C. until the desired quantity of chlorine has been absorbed, the said reaction being effected in the presence of phosphorus trichloride.

7. Process for the chlorination of the methane residue of a chlorophenoxymethane which comprises subjecting a chlorophenoxymethane in which at most two of the hydrogen atoms of the methane residue are substituted by chlorine atoms, in the liquid phase to the action of chlorine at a temperature of 180–200° C. until the desired quantity of chlorine has been absorbed, the said reaction being effected in the presence of sulphur monochloride.

8. Process for the chlorination of the methane residue of a chlorophenoxymethane which comprises subjecting a chlorophenoxymethane in which at most two of the hydrogen atoms of the methane residue are substituted by chlorine atoms, in the liquid phase to the action of chlorine at a temperature of 195–200° C. until the desired quantity of chlorine has been absorbed, the said reaction being effected in the presence of phosphorus pentachloride.

9. Process for the production of 2:4-dichlorophenoxymethylmonochloride which comprises subjecting 2:4-dichlorophenoxymethane, in the liquid phase, to the action of chlorine at a temperature of 160–260° C. until one molecular equivalent of chlorine has been absorbed.

10. Process for the production of 2:4-dichlorophenoxymethylmonochloride which comprises subjecting 2:4-dichlorophenoxymethane, in the liquod phase, to the action of chlorine at a temperature of 160–260° C. until one molecular equivalent of chlorine has been absorbed, the said reaction being effected in the presence of phosphorus pentachloride.

References Cited in the file of this patent

UNITED STATES PATENTS

| | | |
|---|---|---|
| 2,231,026 | Quattlebaum et al. | Feb. 11, 1941 |
| 2,430,822 | Nevison | Nov. 11, 1947 |

FOREIGN PATENTS

| | | |
|---|---|---|
| 647,215 | Great Britain | Dec. 6, 1950 |

OTHER REFERENCES

Plazek: Chem. Abstracts, vol. 25, pp. 1504–1505 (1931).

Barber et al.: Jour. Applied Chem. vol. 3, pp. 409–416 (September 1953).